O. O. KRUH.
VAPOR ELECTRIC APPARATUS.
APPLICATION FILED APR. 13, 1906.

1,032,914.

Patented July 16, 1912.

2 SHEETS—SHEET 1.

Witnesses:

Inventor:
Osias O. Kruh,
by His Attorney.

O. O. KRUH.
VAPOR ELECTRIC APPARATUS.
APPLICATION FILED APR. 13, 1906.

1,032,914.

Patented July 16, 1912.
2 SHEETS—SHEET 2.

WITNESSES:
George H. Thornton.
Helen Oxford

INVENTOR:
Osias O. Kruh,
By Albert G. Davis
Att'y.

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

VAPOR ELECTRIC APPARATUS.

1,032,914. Specification of Letters Patent. Patented July 16, 1912.

Application filed April 13, 1906. Serial No. 311,492.

*To all whom it may concern:*

Be it known that I, OSIAS O. KRUH, a subject of the Emperor of Austria-Hungary, residing at Schenectady, in the county of Schenectady, State of New York, have invented certain new and useful Improvements in Vapor Electric Apparatus, of which the following is a specification.

My invention comprises a novel arrangement for producing light, rectifying alternating currents, and the like. It is preferably embodied in a structure in which mercury vapor is to a large extent the conducting medium for the current.

The novel features which characterize my invention I have pointed out in detail in the appended claims. The invention itself, however, will be better understood by reference to the following description taken in connection with the accompanying drawings, in which—

Figure 1:
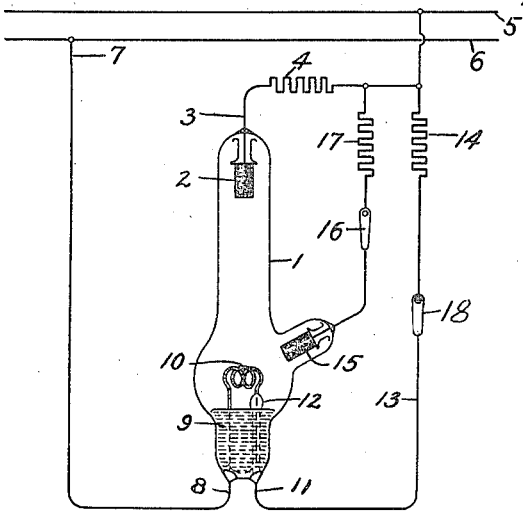
Figure 2:
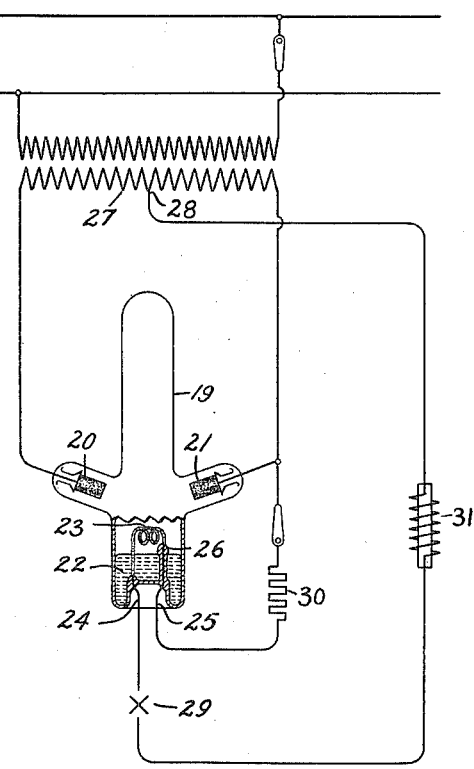
Figure 3:
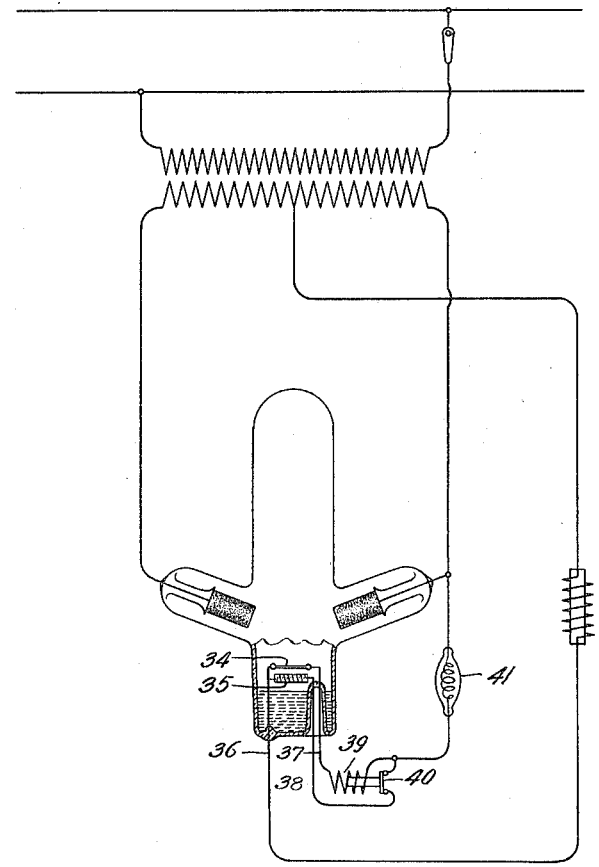
Figure 4:
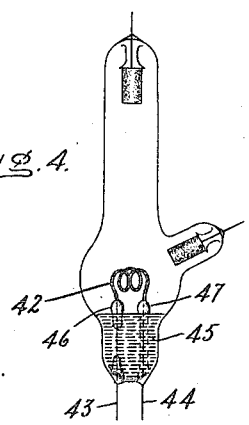

Figure 1 represents an embodiment of my invention for producing light; Fig. 2 shows my invention as arranged for the rectification of alternating currents; and Figs. 3 and 4 are a modification.

In Fig. 1 a highly exhausted glass tube is indicated at 1. The form of this tube may be widely varied, that shown in the drawing being merely illustrative. At the top of the tube is located a positive electrode 2 of any suitable material, such as tantalum, iron, tungsten, or the like, which electrode is provided in the usual manner with a leading-in conductor, as at 3. This electrode 2 is connected, through a steadying resistance 4, to one of the mains 5 of a direct current or alternating current supply circuit. The other main 6 of the supply circuit is connected by a lead 7 to a leading-in conductor 8 extending up through the bottom of the tube or container 1, and making electrical contact with the body of mercury 9 in the bottom of the container. This leading-in conductor, besides making electrical contact with the mercury, extends above the surface of the mercury and supports one end of a small helix or glower 10, the other end of which is carried by a separate leading-in conductor 11. This latter leading-in conductor is insulated from the mercury by some suitable means, such as a glass tube 12, and is connected by a lead 13 through a resistance 14 to the supply main 5.

The helix 10 may be of some refractory wire, such as platinum, tantalum, tungsten, or the like, and is coated with a suitable oxid, as for example, barium oxid, calcium oxid, thorium oxid, zirconium oxid, yttrium oxid, lanthanum oxid, or other oxids or mixtures thereof. The oxid or oxids may be applied in a variety of ways. Thus, for example, for barium oxid I find it convenient, after dipping the helix repeatedly in a solution of barium nitrate and drying between each dipping, then to heat the helix in a flame, thereby converting the nitrate into oxid. If the helix be brought to a red heat it will give off negative ions or negative electricity and render the interior of the container 1 conductive for current. For rendering the starting of the lamp easier I may use an auxiliary anode 15, connected to the same lead as the anode 2, but located near the helix 10. As the envelop becomes conducting by the action of the helix the current first passes from the auxiliary anode 15 and, if a resistance 17 is used in series with the anode 15, then deserts the same and goes to the main anode 2. When the apparatus is adjusted to take a small current I find that the operation apparently is not that of the ordinary mercury arc, for there is no cathode spot produced on the surface of the mercury, nor does there seem to be anything equivalent thereto. On the contrary, the current flow fills the tube with a brilliant illumination taking place through mercury vapor in the tube, which illumination in appearance, at least, is exactly like that of the well-known mercury arc lamp except that there is no cathode spot on the mercury and, therefore, absolutely no flickering or pulsation in the light.

It should be mentioned that the helix 10 is or may be kept glowing all the time. The oxid coating, when heated, apparently has the power of readily emitting negative ions or negative electricity, and it does this at a relatively low temperature. These negative ions or this negative electricity is instrumental in transferring current through mercury vapor in the tube and thereby produces a brilliant illumination without any considerable evaporation of mercury, and at the same time with apparently very high efficiency.

I may, if desired, omit entirely the starting electrode 15, but, if I use it, I may, when the apparatus has started, cut it out of circuit either by a switch, as at 16, or by the use of the resistance 17 hereinbefore mentioned. The current will, with the aid of resistance 17, automatically desert the starting electrode 15 as soon as the discharge in the tube passes to the main anode 2. A switch 18 may be used to cut the helix out of circuit, if so desired, after the lamp has started.

In applying my invention to the rectification of alternating current, I may use an arrangement as shown, for example, in Fig. 2. In this figure the rectifier tube is indicated at 19 and is provided with two anodes 20 and 21. At the bottom of the tube is located a body of mercury 22. In proximity to this body of mercury there is a small helix 23 of oxid-coated wire similar to the helix 10 in Fig. 1. Leading-in conductors 24 and 25 support this helix as indicated. The leading-in conductor 24 makes contact with the mercury 22, while the other leading-in conductor 25 is insulated therefrom by the glass tube 26.

Various connections for the rectifier may be used. Thus, as in Fig. 2, a transformer supplies the rectifier, and the secondary 27 has its terminals connected to the anodes 20 and 21. The middle point 28 of the secondary is connected by a lead through the work circuit 29 to the negative leading-in conductor 24 of the rectifier. The other leading-in conductor 25 is connected through a resistance 30 to one of the supply mains or anode leads.

The helix 23, being maintained in a luminous condition, results in a unidirectional flow of current through the tube and thus enables continuous rectification of the alternating current to take place, whereby rectified current is supplied to the work circuit 29. An inductance 31 in the direct current circuit may be used for smoothing out the direct current.

Instead of keeping the helix 10 in Fig. 1 and the helix 23 of the rectifier in Fig. 2, continuously heated to luminosity, I may utilize the action of the helix merely as means for starting the respective devices into operation and thereby producing mercury arcs, after which the helices may be cut out of circuit by suitable switches. When this is done with respect to Fig. 2, the inductance coil 31 then serves to give an overlapping of the current waves and keeps the rectifier alive.

With respect to the use of a helix, as for example in Fig. 1, I may mention that when this helix is kept constantly excited, current of a very small value may be used in the tube, so small indeed that no mercury arc would be possible under ordinary conditions. Small light units are thus rendered feasible and these units are of high efficiency.

Instead of using an oxid coated wire as the means for producing emission of negative ions or negative electricity as a starting or maintaining device for rectifiers, lamps, or the like, I may use instead a glower of oxids, and a heater, separate from each other as in the ordinary Nernst lamp. Thus in Fig. 3 of the drawings I have indicated such a glower at 34 and a heater of any suitable type at 35. These are electrically connected together to a common leading-in conductor at 36 and at their opposite ends are separately connected to corresponding leading-in conductors 37 and 38. The glower circuit is connected with a cut-out magnet 39 which operates a switch 40 to cut the heater out of circuit when the glower is started. An iron wire ballast resistance, in a glass tube containing an inert atmosphere, may be used in series with the glower circuit, as at 41. The connections of the system shown in Fig. 3 are otherwise the same as in Fig. 2 and require no further explanation. It is of course evident from the foregoing that a separate glower and heater, as shown in Fig. 3, may be used to replace the helix 10 in Fig. 1. It is also to be noted that where I speak herein of a helix I do so for convenience of description and do not limit myself to any particular configuration of the body emitting negative electricity, for this may be widely varied. Also, a separate source of current, as a storage battery, may be used to heat the oxid member.

Instead of having one terminal only of the heated oxid member out of electrical engagement with the mercury, I may arrange it so that both terminals are out of contact with the mercury. In Fig. 4, I have shown this modification as applied to the tube illustrated in Fig. 1, but it will be understood that the other figures of the drawing may be similarly modified. In Fig. 4 a member which emits the negative electricity, and which for convenience I call the oxid member, is shown at 42. It is connected with current-conveying leads 43 and 44 which pass up through the body of mercury 45. The portions of the leads projecting from the mercury are insulated therefrom in any suitable manner, as, for example, by the vitreous coatings 46 and 47. Below the surface of the mercury the lead 43, corresponding to the common negative lead 9 in Fig. 1, is bared so as to make contact with the mercury, and thus serves to convey current to the mercury as well as to the member 42. This arrangement serves as a starting means for the mercury arc and, after the arc is once started, current in the oxid member may be shut off in any suitable manner, though, of course, it may be continued, if desired.

What I claim as new and desire to secure by Letters Patent of the United States, is:

1. The combination of a hermetically sealed envelop, electrodes therein, a glower in proximity to one of the electrodes, insulating material interposed between the glower and the surface of said electrodes, and current connections for electrically heating said glower.

2. The combination of an exhausted envelop, electrodes therein one at least of which is of fluid material, and current carrying means electrically disconnected from the surface of the fluid electrode for subjecting the fluid electrode to radiations for rendering the space in said envelop conductive.

3. The combination of a sealed envelop, electrodes therefor, one at least of which is of a fluid or similar vaporizable material, and means for disengaging negative electricity in the vicinity of said fluid or similar vaporizable electrode, said means consisting of a heated conductor located near said fluid or similar vaporizable electrode and electrically unconnected at the surface of the other electrode or electrodes.

4. The combination of a sealed envelop, working electrodes therein one at least of which is of mercury, an oxid glower in proximity to the mercury electrode, means for initially heating said glower, and means for conveying electric energy to said glower to incandesce the same whereby the mercury electrode will be subjected to radiations for rendering the space in said envelop conductive.

5. The combination of a source of current, an evacuated container having a cathode of easily vaporizable material, a coöperating main anode and an auxiliary anode all connected to said source, an oxid glower in said container, and means for heating said glower to luminosity to start an arc between the cathode and auxiliary anode which in turn starts an arc between the main electrodes.

In witness whereof, I have hereunto set my hand this 12th day of April, 1906.

OSIAS O. KRUH.

Witnesses:
BENJAMIN B. HULL,
HELEN ORFORD.